United States Patent [19]

Rissanen

[11] Patent Number: 5,130,090
[45] Date of Patent: Jul. 14, 1992

[54] COPPER ALLOYS TO BE USED AS BRAZING FILLER METALS

[75] Inventor: Petri T. Rissanen, Pori, Finland

[73] Assignee: Outokumpu Oy, Helsinki, Finland

[21] Appl. No.: 614,254

[22] Filed: Nov. 15, 1990

[30] Foreign Application Priority Data

Nov. 17, 1989 [FI] Finland .................. 895483

[51] Int. Cl.$^5$ .................. C22C 9/02; C22C 9/06
[52] U.S. Cl. .................. 420/472; 420/473; 420/493; 228/263.18
[58] Field of Search ........... 420/472, 473, 485, 493, 420/499; 228/263.18

[56] References Cited

U.S. PATENT DOCUMENTS

| | | | |
|---|---|---|---|
| 1,954,168 | 4/1934 | Ellis | 420/499 |
| 2,125,680 | 8/1938 | MacGregor | 420/472 |
| 4,540,437 | 9/1985 | Patel | 420/472 |

FOREIGN PATENT DOCUMENTS

| | | | |
|---|---|---|---|
| 62-63633 | 3/1987 | Japan . | |
| 481387 | 12/1975 | U.S.S.R. | 420/472 |
| 2168078 | 6/1986 | United Kingdom | 420/472 |

*Primary Examiner*—George Wyszomerski
*Attorney, Agent, or Firm*—Brooks Haidt Haffner & Delahunty

[57] ABSTRACT

The invention relates to low-nickel copper alloys to be used as brazing filler metals, which alloys also contain phosphor, tin and possibly small amounts of manganese. The alloys are produced by means of rapid solidification. Their advantages are low liquidus temperature and narrow mushy zone. The alloys are mainly used for brazing copper and its alloys.

4 Claims, No Drawings

COPPER ALLOYS TO BE USED AS BRAZING FILLER METALS

The present invention relates to low-nickel copper alloys to be used as brazing filler metal, which alloys also contain phosphorus, tin and possibly small amounts of manganese. The said alloys are produced by rapid solidification, RS. The advantages of these alloys are their low liquidus temperature and narrow mushy zone. These alloys are mainly used for brazing copper and its alloys.

Soldering is the term for joining metallic or ceramic parts of a workpiece by means of molten metal, i.e. filler metal, the melting temperature whereof is lower than that of the parts to be joined. The molten filler metal wets the surfaces of the parts to be joined, without melting them. When the working temperature of the filler metal is over 450° C., the respective term is brazing, and the filler metal is called brazing filler metal. The working temperature of the brazing filler metal depends on its chemical composition. Pure metals have defined melting points, but with most metal alloys the transformation from solid to liquid state takes place within a certain mushy zone. The top limit of the solid phase is called solidus, and the bottom limit of the liquid phase is called liquidus. Within the temperature range between these phase limits, the material is composed of a mixture of solid and liquid phase. In mass production, particularly in machine brazing, the mushy zone of filler metal must be narrow, in order to minimize the time needed to solidify a joint. In automatic brazing, the mushy zone of the filler metal must not surpass 50° C. It is also recommendable that the working temperature of the brazing filler metal be low, because working time is costly. The working temperature of filler metal is the lowest temperature, in which filler metal melts and wets a workpiece to be joined and where the filler metal spreads, flows and is bound to the basic material.

Brazing filler metals can be produced by many different methods. A common feature of all RS methods is the high cooling rate of alloy, which is produced with the process, as well as the quenching of the melt into the final shape, without further reduction. The cooling temperature generally is higher than $10^5$ K/s. Owing to the high cooling rate, the prepared alloy is more homogeneous both in composition and structure than a conventionally produced alloy. These methods enable the production of microcrystalline and even amorphous alloys, if the material composition is advantageous for the formation of an amorphous phase, and the cooling rate is high enough. The said methods are called RS (rapid solidification) methods.

The most commonly used additive in copper-based brazing filler metal is phosphorus, because then a separate flux is not needed in the brazing of copper. While the only alloying element employed is phosphorus, the melting temperature of the alloy remains fairly high. For eliminating this drawback, among others, there are developed alloys which contain for instance silver and cadmium in addition to phosphorus. Among cadmium-bearing fillers let us mention for example BAg-1, the composition whereof is Ag38Cu21Zn22Cd19 (composition given in atomic percent), and the mushy zone 605°-650° C. Another silver-bearing brazing filler alloy is BCuP-5, the composition whereof is Ag9Cu80P11, and the mushy zone is 633°-680° C. The brazing suitability of these conventionally produced filler metals is good, but silver as an alloying element makes them expensive, and what is more the cadmium contained in BAg-1 is toxic.

In order to replace silver and cadmium bearing brazing filler metals, there are developed alloys which, in addition to phosphorus, contain either nickel alone, or nickel and tin. The brazing filler metal Cu-Ni-P and its properties are described, among others, in the U.S. Pat. No. 4,253,870. These alloys can be produced at least partly as amorphous by means of the RS method, when the alloy composition is within the area 5–40 atom percent Ni, 15–20 atom percent P, the balance being Cu and incidental impurities. The essential feature for the brazing filler metal is that it is at least partly amorphous in structure.

The use of tin as an alloying element lowers the working temperature of the filler metal, so that the brazing can be carried out at a lower temperature than with the Cu-Ni-P brazing filler metal. The EP patent publication 103,805 relates to a Cu-Ni-Sn-P alloy produced by the rapid solidification method, the composition of the alloy being within the area 5–52 atom percent Ni, 2–10 atom percent Sn, 10–15 atom percent P, and the balance being copper. In commercial production there are two of these alloys, i.e. Metglas 2002, the composition whereof is Cu74Ni10Sn2P14 (in atom percents), and the mushy zone 610°-660° C., and Metglas 2005, the composition whereof is Cu76Ni6Sn5P13, and the mushy zone 592°-655° C. The advantage of these filler metals is that their mushy zone is roughly equal to that of the brazing filler BAg-1, with a high silver content, but they are considerably more economical in price. It has been found out that these brazing filler metals have the lowest working temperature known so far, when copper is brazed without flux.

According to the present invention there is now developed a Cu-Ni-Sn-P brazing filler alloy produced by the RS method, where the nickel content has been reduced, and consequently there are achieved lower working temperatures, stronger joints and higher impact strength, owing to the reduced volume fraction of the fragile nickel phosphide phase. The Ni content of the novel brazing filler alloy is within the range 0–5 atom percent, advantageously within the range 2.0–4.8 atom percent, the Sn content 0–15 atom percent, advantageously 1.5–10.0 atom percent, and the P content 10–20 atom percent, advantageously 11.0–16.5 atom percent.

In the brazing filler alloy of the invention, part of the nickel can also be replaced by manganese. The alloy can contain 0.5 to 5.4 atom percent manganese. The essential novel features of the invention are apparent from the appended patent claims.

The strip-like product can be manufactured among others by the melt spinning, planar flow casting, melt drag, double roller and melt over flow methods. Best suited for industrial production are the planar flow casting, melt drag and melt spinning methods, the two former whereof can be used for producing strips at least 30 cm wide. For instance in the planar flow casting method, the brazing filler alloy which is first melted in a ceramic crucible and then overheated, is sprayed through a rectangular slot of a nozzle onto the surface of a rapidly rotating cooling roll. The melt pool formed in between the roll and the nozzle is solidified into continuous strip. In the melt spinning method the nozzle aperture is a round hole, with a diameter of roughly 1 mm, wherefore the maximum width of the strips to be manufactured is about 5 mm. The thickness of the strips is 0.01–0.05 mm. A chip-like product is obtained by means of the melt extraction method, and powder by means of the atomizing method or by grinding the above mentioned strip-like or chip-like products. The fine powder produced by means of the gas atomizing method can be mixed to a suitable binder in order to produce a paste suited for brazing. The product of the present invention can be produced by means of the above described methods.

The invention is further described by means of an example, where the now developed brazing filler metal is compared to some prior art products produced by means of the RS method. The example shows that the liquidus temperature of the new Cu-Ni-Sn-P alloys was 20°–30° C. lower than the liquidus temperatures of corresponding brazing filler alloys with a high nickel content. The tensile strengths were higher than the tensile strengths of the brazed joints made by the Metglas alloys.

EXAMPLE

The table below presents first the composition and mushy zone as well as the ultimate tensile strength (UTS) of a copper-copper joints brazed with four brazing filler strips of the present invention, and then the corresponding properties of the earlier mentioned brazing filler strips Metglas 2002 and Metglas 2005. The brazing filler strips of the present invention are produced by the planar flow casting method. The mushy zone of the composition was defined by means of differential thermal analysis in argon atmosphere, while the heating rate was 5 K/min.

In order to measure the ultimate tensile strength, butt joints of square copper rods (K1 E 10×10 mm). The thickness of the filler metal layer was 0.04 mm. The pieces to be joined were pressed slightly together and then brazed in a tube furnace with argon flow. They were kept in the furnace for 15 minutes, 5 minutes of which time the pieces were at the brazing temperature. The brazing temperature was 100° C. higher than the liquidus temperature of the alloy. It is worth noticing that the brazing with the alloys succeeded at remarkably lower temperatures, too. In the tensile tests all brazed pieces were broken at the joint, wherefore the measured ultimate tensile strengths (UTS) are tensile strengths of the brazed joints. The appended results show that the tensile strength of the brazed joints made by means of the alloys 1 and 2 of the invention were higher than those of the brazed joints made by means of the Metglas alloys. The tensile strength of the joint made by the alloy 3 was higher than that of the brazed joints made by the Metglas 2002 alloy.

TABLE

| Alloy No. | % | Cu | Ni | Mn | Sn | P | Mushy zone [°C.] | UTS [N/mm2] |
|---|---|---|---|---|---|---|---|---|
| 1 | at. % | 78.8 | 4.3 | — | 2.1 | 14.8 | 608–629 | 170 |
|   | wt. % | 83.8 | 4.2 | — | 4.3 | 7.7 |   |   |
| 2 | at. % | 76 | 3.2 | — | 8.4 | 12.4 | 583–610 | 176 |
|   | wt. % | 75.5 | 2.9 | — | 15.6 | 6 |   |   |
| 3 | at. % | 77.5 | 2.4 | 2.7 | 2.2 | 15.2 | 599–653 | 113 |
|   | wt. % | 82.9 | 2.4 | 2.5 | 4.3 | 7.9 |   |   |
| Metglas 2002 | at. % | 72 | 9.9 | — | 1.8 | 16.3 | 625–643 | 103 |
|   | wt. % | 77.9 | 9.8 | — | 3.7 | 8.6 |   |   |
| Metglas 2005 | at. % | 74.9 | 6.3 | — | 4.1 | 14.7 | 595–635 | 163 |
|   | wt. % | 78.4 | 6 | — | 8.1 | 7.5 |   |   |

I claim:

1. A brazing filler alloy produced by means of the rapid solidification method and for use in brazing copper and copper alloys, said brazing filler alloy consisting essentially of at least 2.0 to 5.0 atom percent Ni, 0–15 atom percent Sn, 10–20 atom percent P and 0.5–5.4 atom percent manganese, the balance being copper and incidental impurities.

2. The alloy of claim 1 wherein the amount of Ni is within the range of 2.0 to 4.8 atom percent.

3. The alloy of claim 1 wherein the amount of Sn is within the range of 1.5 to 10.0 atom percent.

4. The alloy of claim 1 wherein the amount of P is within the range of 11.0 to 16.5 atom percent.

* * * * *